(12) United States Patent
Thomas et al.

(10) Patent No.: US 8,352,101 B2
(45) Date of Patent: Jan. 8, 2013

(54) ALGORITHM FOR SIMULTANEOUS ATTITUDE MANEUVER AND MOMENTUM DUMPING

(75) Inventors: Ronald Shawn Thomas, Brea, CA (US); Richard I. Milford, Redondo Beach, CA (US)

(73) Assignee: The Boeing Company, Chicago, IL (US)

( * ) Notice: Subject to any disclaimer, the term of this patent is extended or adjusted under 35 U.S.C. 154(b) by 672 days.

(21) Appl. No.: 12/645,296

(22) Filed: Dec. 22, 2009

(65) Prior Publication Data
US 2011/0153123 A1    Jun. 23, 2011

(51) Int. Cl.
*B64G 1/24* (2006.01)
*G05D 1/00* (2006.01)

(52) U.S. Cl. .......................................... 701/13; 244/164
(58) Field of Classification Search .......... 244/164–171; 701/13
See application file for complete search history.

(56) References Cited

U.S. PATENT DOCUMENTS

| | | | | |
|---|---|---|---|---|
| 3,866,025 A | * | 2/1975 | Cavanagh | 701/13 |
| 4,071,211 A | * | 1/1978 | Muhlfelder et al. | 244/165 |
| 4,306,692 A | * | 12/1981 | Kaplan et al. | 244/165 |
| 4,767,084 A | * | 8/1988 | Chan et al. | 244/164 |
| 4,931,942 A | * | 6/1990 | Garg et al. | 701/13 |
| 5,035,381 A | * | 7/1991 | Matthews | 244/164 |
| 5,098,041 A | * | 3/1992 | Uetrecht | 244/164 |
| 5,255,879 A | * | 10/1993 | Yocum et al. | 244/171 |
| 5,310,144 A | * | 5/1994 | Salvatore et al. | 244/168 |
| 5,349,532 A | * | 9/1994 | Tilley et al. | 701/13 |
| 5,655,735 A | * | 8/1997 | Wirthman et al. | 244/165 |
| 5,692,707 A | * | 12/1997 | Smay | 244/165 |
| 5,752,675 A | * | 5/1998 | Holmes et al. | 244/168 |
| 5,765,780 A | * | 6/1998 | Barskey et al. | 244/165 |
| 5,794,892 A | * | 8/1998 | Salvatore | 244/165 |
| 5,884,869 A | * | 3/1999 | Fowell et al. | 244/169 |
| 5,949,675 A | * | 9/1999 | Holmes et al. | 700/37 |
| 5,984,236 A | * | 11/1999 | Keitel et al. | 244/164 |

(Continued)

FOREIGN PATENT DOCUMENTS

EP    0568209 A1    11/1993
(Continued)

OTHER PUBLICATIONS

Examiner's Report dated Mar. 31, 2011 including Search Report for GB Application No. GB1020301.6 (5pages).

*Primary Examiner* — Joseph Rocca
*Assistant Examiner* — Laura Freedman
(74) *Attorney, Agent, or Firm* — Vista IP Law Group, LLP; Cynthia A. Dixon

(57) ABSTRACT

A system and method are disclosed for simultaneous attitude maneuver and momentum dumping. The attitude maneuver is performed using nominal wheel control to minimize propellant usage, while applying a momentum management command to the thruster control loop in order for the wheels to accomplish the desired spacecraft maneuver while simultaneously being reset to a de-saturated target state. The system and method involve a wheel system comprised of reaction wheels and/or a control moment gyroscope (CMG), at least one thruster, and control logic that is in communication with the wheel system and thruster(s). If a spacecraft maneuver is in progress, the control logic biases an error input signal to a thruster control loop to track the wheel maneuver to prevent unnecessary propellant consumption. The control logic is further operable to output thruster torque commands and wheel torque commands that accomplish the maneuver while achieving the desired final momentum target.

19 Claims, 5 Drawing Sheets

U.S. PATENT DOCUMENTS

| | | | |
|---|---|---|---|
| 6,003,818 A | 12/1999 | Shah et al. | |
| 6,015,116 A * | 1/2000 | Anzel et al. | 244/169 |
| 6,019,320 A * | 2/2000 | Shah et al. | 244/171 |
| 6,021,979 A * | 2/2000 | Bender et al. | 244/164 |
| 6,032,903 A * | 3/2000 | Fowell et al. | 244/165 |
| 6,042,058 A * | 3/2000 | Anzel | 244/164 |
| 6,053,455 A * | 4/2000 | Price et al. | 244/169 |
| 6,076,772 A * | 6/2000 | Eyerly et al. | 244/164 |
| 6,076,773 A * | 6/2000 | Salvatore | 244/164 |
| 6,089,510 A * | 7/2000 | Villani et al. | 244/166 |
| 6,260,805 B1 * | 7/2001 | Yocum et al. | 244/164 |
| 6,292,722 B1 * | 9/2001 | Holmes et al. | 701/13 |
| 6,293,501 B1 | 9/2001 | Kurland | |
| 6,296,207 B1 * | 10/2001 | Tilley et al. | 244/169 |
| 6,340,138 B1 * | 1/2002 | Barsky et al. | 244/165 |
| 6,347,262 B1 * | 2/2002 | Smay et al. | 701/13 |
| 6,435,457 B1 * | 8/2002 | Anzel | 244/169 |
| 6,445,981 B1 * | 9/2002 | Higham et al. | 701/13 |
| 6,550,721 B2 * | 4/2003 | Williams et al. | 244/165 |
| 6,571,156 B1 * | 5/2003 | Wang et al. | 701/13 |
| 6,921,049 B2 * | 7/2005 | Fowell | 244/164 |
| 7,149,610 B2 * | 12/2006 | Wang et al. | 701/13 |
| 7,546,983 B2 * | 6/2009 | Wang et al. | 244/172.7 |
| 7,654,490 B2 * | 2/2010 | Patel et al. | 244/165 |
| 7,918,420 B2 * | 4/2011 | Ho | 244/169 |
| 2009/0078829 A1 | 3/2009 | Ho et al. | |
| 2010/0193641 A1 * | 8/2010 | Liu et al. | 244/165 |

FOREIGN PATENT DOCUMENTS

EP  0781706 A2  7/1997

* cited by examiner

ALGORITHM FOR SIMULTANEOUS ATTITUDE MANEUVER AND MOMENTUM DUMPING

BACKGROUND

The present disclosure relates to simultaneous attitude maneuver and momentum dumping. In particular, it relates to a system and method to compute spacecraft (S/C) thruster commands to apply de-saturation torques that overlap spacecraft control to simultaneously maneuver the spacecraft and manage momentum.

SUMMARY

The present disclosure relates to a system, apparatus, and method for simultaneous attitude maneuver and moment dumping. In one or more embodiments, the simultaneous attitude maneuver and moment dumping method involves determining if a spacecraft maneuver is in progress. If it is determined that a spacecraft maneuver is in progress, reaction wheel speed and/or control moment gyroscope (CMG) gimbal position and wheel speed is determined. The method further involves computing momentum components, and summing the momentum components in order to compute an adjusted total system momentum. Further, the method involves computing system momentum due to spacecraft rate commands; computing final momentum targets; computing a momentum residual; applying an active control law to the momentum residual; and outputting computed thruster torque commands and reaction wheel/CMG torque commands.

In one or more embodiments, an executive software (S/W) dispatcher initiates the spacecraft maneuver. In some embodiments, the system momentum is obtained from the reaction wheel speed and/or control moment gyroscope gimbal position and wheel speed measurements, spacecraft inertial rate, and spacecraft inertia tensor. In at least one embodiment, the final momentum targets are based on the adjusted total system momentum, maneuver commands, and post maneuver momentum. In one or more embodiments, the momentum residual is equal to the final momentum targets minus the adjusted total system momentum.

In some embodiments, the active control law is a proportional integral derivative (PID) control law. In other embodiments, the active control law is a proportional integral (PI) control law. In one or more embodiments, the computed torque thruster commands are conditioned to preclude actuator saturation. In some embodiments, the computed torque reaction wheel/CMG torque commands are conditioned to preclude actuator saturation. In at least one embodiment, the computed thruster torque commands are outputted to a thruster-processing algorithm. In some embodiments, the computed reaction wheel/CMG torque commands are outputted to a reaction wheel/CMG processing algorithm.

In one or more embodiments, the system for simultaneous attitude maneuver and momentum dumping involves a reaction wheel/CMG system; at least one thruster; and control logic in communication with the reaction wheel/CMG system and at least one thruster. The control logic is operable to: (a) determine if a spacecraft maneuver is in progress; (b) if a spacecraft maneuver is in progress, reaction wheel speed and/or control moment gyroscope gimbal position and wheel speed is determined; (c) compute momentum components; (d) sum the momentum components in order to compute an adjusted total system momentum; (e) compute system momentum due to spacecraft rate commands; (f) compute final momentum targets; (g) compute momentum residual; (h) apply an active control law to the momentum residual; and (i) output thruster torque and reaction wheel/CMG torque.

In some embodiments, a method for simultaneous attitude maneuver and momentum dumping involves performing a spacecraft maneuver using nominal wheel control, enabling thrusters during the spacecraft maneuver, and biasing an error input signal to a thruster control loop to track a wheel maneuver. The method further involves applying a momentum management command to the thruster control loop and a wheel control loop in order for the wheels to accomplish the desired spacecraft maneuver while being reset to a de-saturated target state.

DRAWINGS

These and other features, aspects, and advantages of the present disclosure will become better understood with regard to the following description, appended claims, and accompanying drawings where:

Figure 4A:
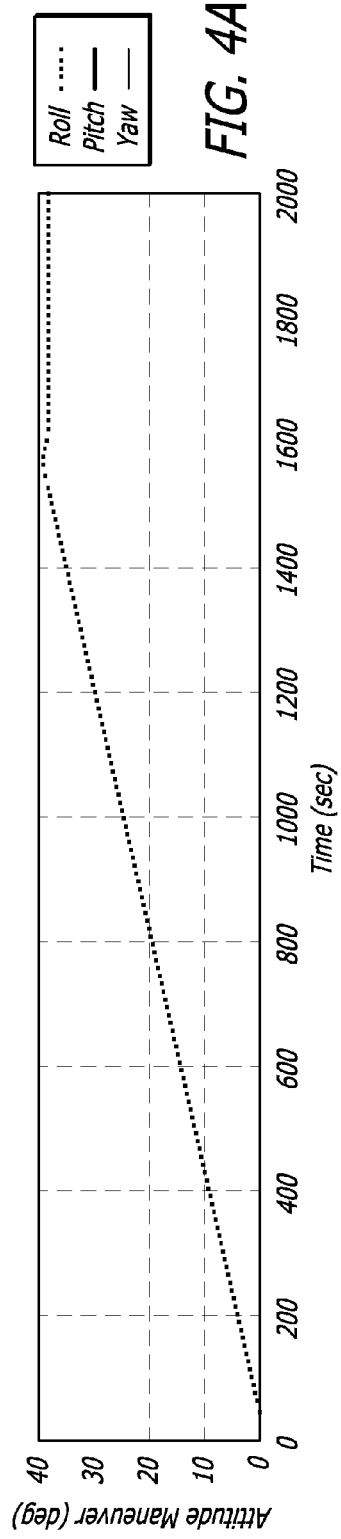
Figure 4B:
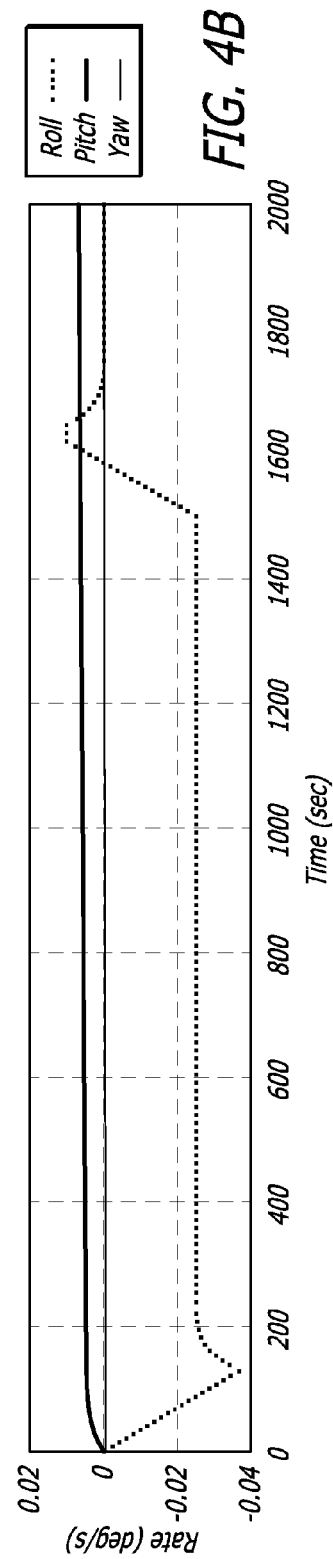
Figure 4C:
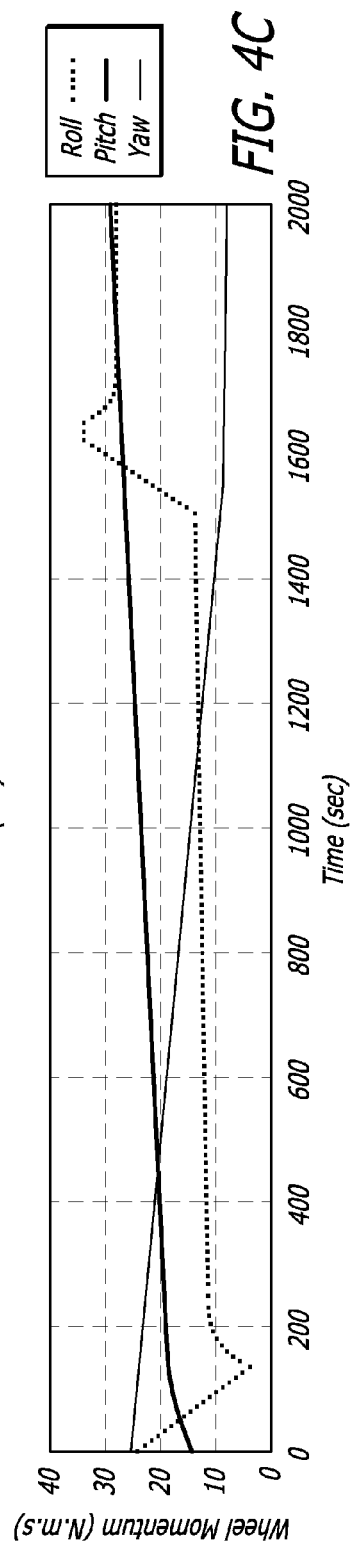

FIGS. 4A, 4B, and 4C show graphs depicting sample results of a reference spacecraft attitude maneuver, which has initial momentum bias and no environmental disturbances.

Figure 5A:
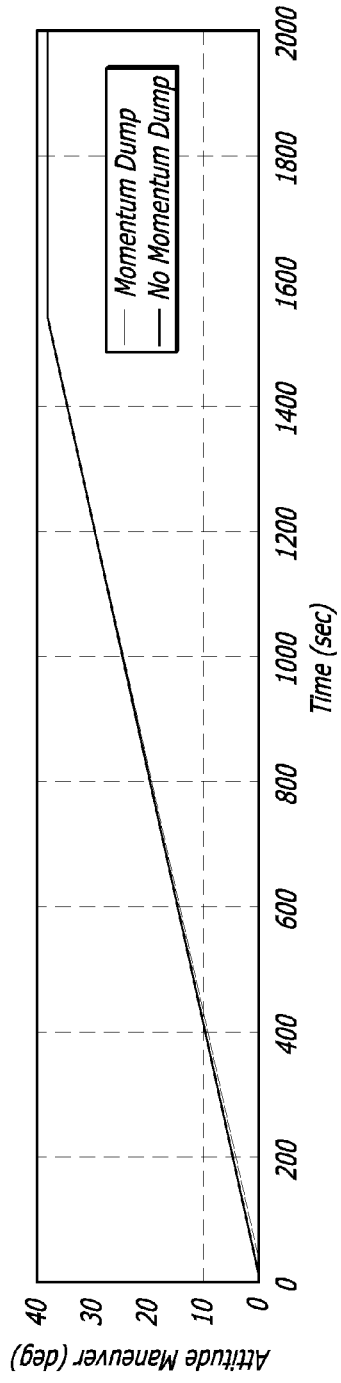
Figure 5B:
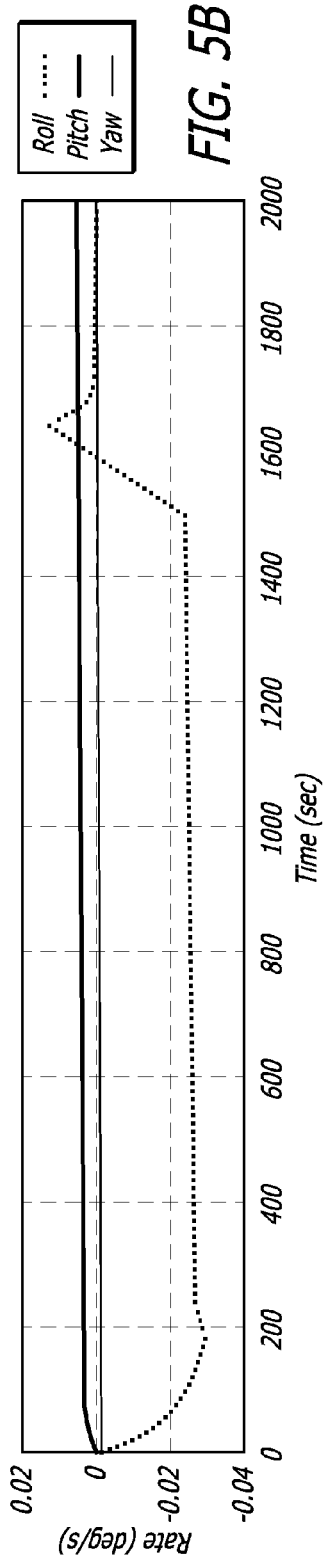
Figure 5C:
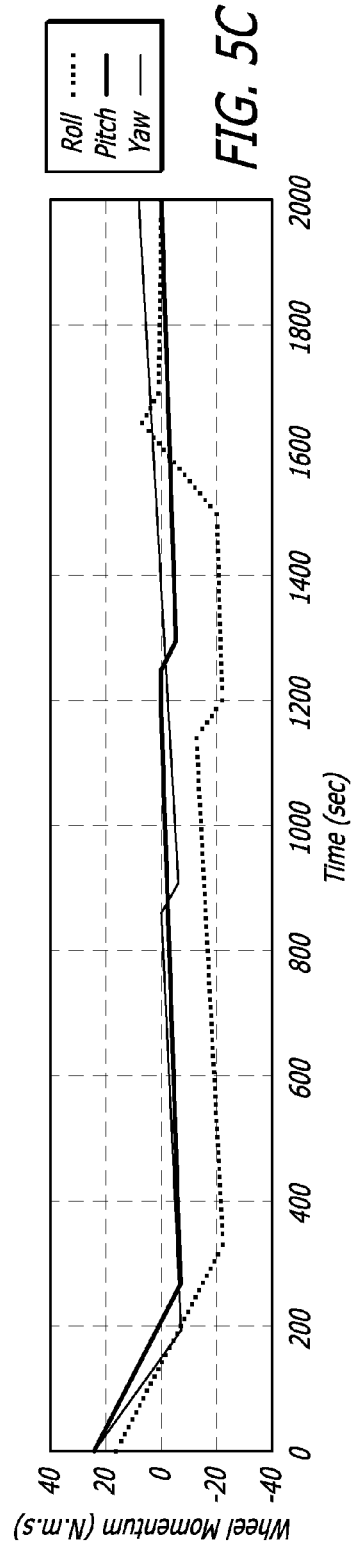

FIGS. 5A, 5B, and 5C show graphs depicting sample results of a simultaneous attitude maneuver and momentum dumping employing the disclosed systems and methods, in accordance with at least one embodiment of the present disclosure.

DESCRIPTION

The methods and apparatus disclosed herein provide an operative system for simultaneous attitude maneuver and momentum dumping. Specifically, this system allows for the computation of spacecraft thruster commands that are used to apply de-saturation torques that overlap spacecraft control to simultaneously maneuver the spacecraft and manage momentum. In essence, the present disclosure provides an optimal system and method to de-saturate momentum storage during an agile spacecraft maneuver.

Typically, agile maneuvering spacecraft use wheel type actuators to perform attitude maneuvers. Types of wheel type actuators commonly employed include, but are not limited to, momentum/reaction wheels and control moment gyroscopes. Thrusters are used to de-saturate the wheels, which is known as "momentum dumping." Orbital operations are typically ceased during the de-saturation of the wheels. As such, since momentum dumping must be scheduled into orbital operations, momentum dumping consumes time on orbit that would otherwise be devoted to mission operations.

The present disclosure teaches a system and method that utilizes thrusters during wheel-based maneuvers to de-saturate the wheels while simultaneously allowing the wheels to slew the spacecraft. Since the system and method simultaneously de-saturate the wheels while slewing, the system and method allow for a more efficient use of orbital maneuver time. The disclosed system and method help to optimize spacecraft mission operation time by eliminating a separate momentum management phase of the on-orbit operation.

In addition, it should be noted that the disclosed system and method help to ensure that the perturbation to the nominal maneuver (i.e. time and trajectory) is minimized. Also, the disclosed system and method help to minimize propellant usage by not using thrusters to perform the spacecraft slew.

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

Figure 1:
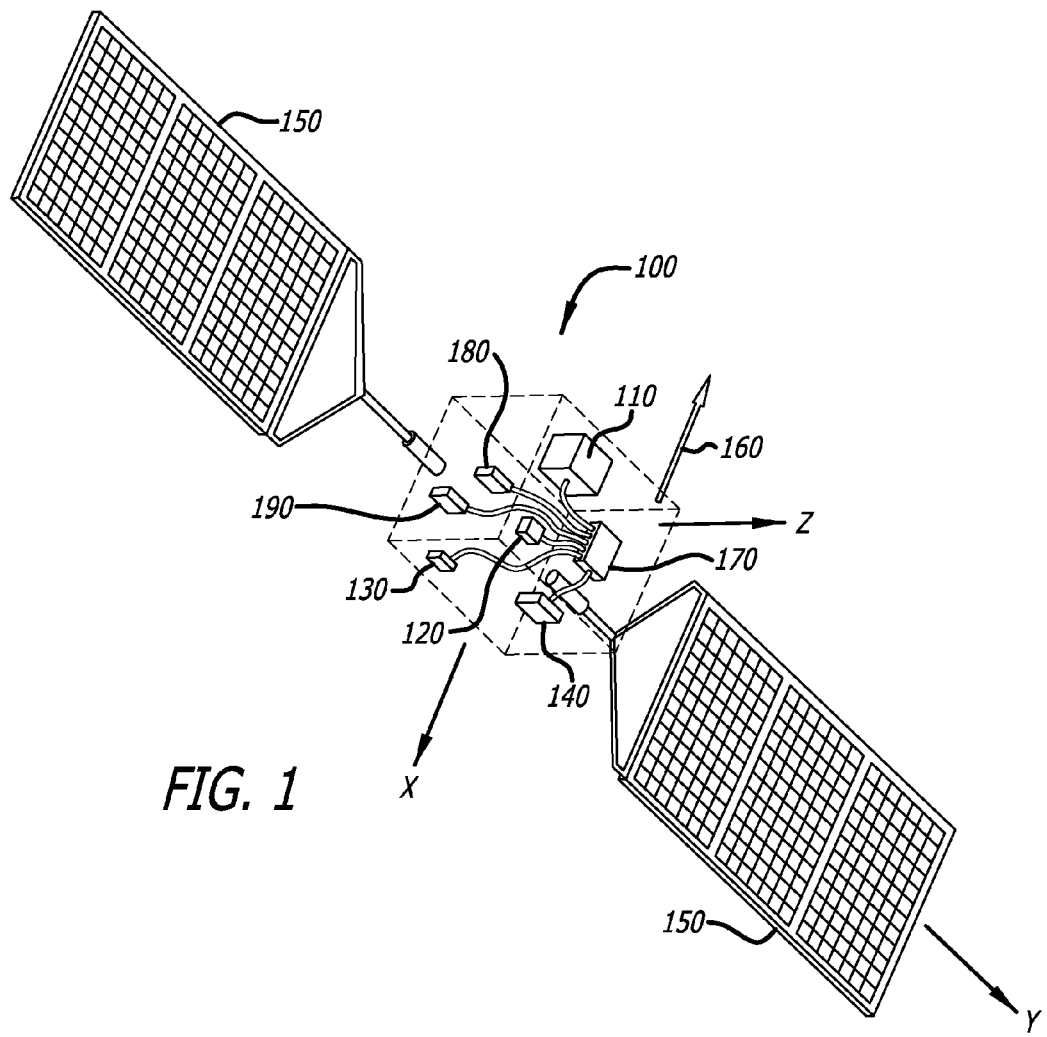
FIG. 1 depicts a graphical representation of a spacecraft that may be employed for the disclosed simultaneous attitude maneuver and momentum dumping systems and methods, in accordance with at least one embodiment of the present disclosure.

FIG. 1 depicts a graphical representation of a spacecraft 100 that may be employed for the disclosed simultaneous attitude maneuver and momentum dumping systems and methods, in accordance with at least one embodiment of the present disclosure. In this figure, the spacecraft 100 is shown to have an orthonormal reference frame, as indicated by the X, Y, and Z-axes. The spacecraft is also shown to include a reaction wheel system 110. In one or more embodiments, the reaction wheel system 110 includes one or more momentum/reaction wheels and/or a control moment gyroscope. The reaction wheel system 110 is used to exchange angular momentum between the wheels and the spacecraft 100 to control the spacecraft attitude (i.e. angular position), which results in accumulated wheel momentum.

In this figure, the spacecraft 100 is shown also to include sensors, which are used for determining attitude and rate. Types of sensors typically included are an earth sensor 120, a sun sensor 130, a star tracker 190, and/or a gyroscope system 140 for rate measurement. In addition, the spacecraft 100 is shown to have solar arrays 150 and an antenna 160. The spacecraft 100 also includes at least one thruster 180.

The spacecraft 110 also includes control logic 170. The control logic 170 is in communication with the reaction wheel system 110, at least one thruster, the earth sensor 120, the sun sensor 130, star tracker 190, and/or the gyroscope system 140. The control logic 170 is able to read attitude and rate information as well as determine wheel system and spacecraft momentum.

Figure 2:
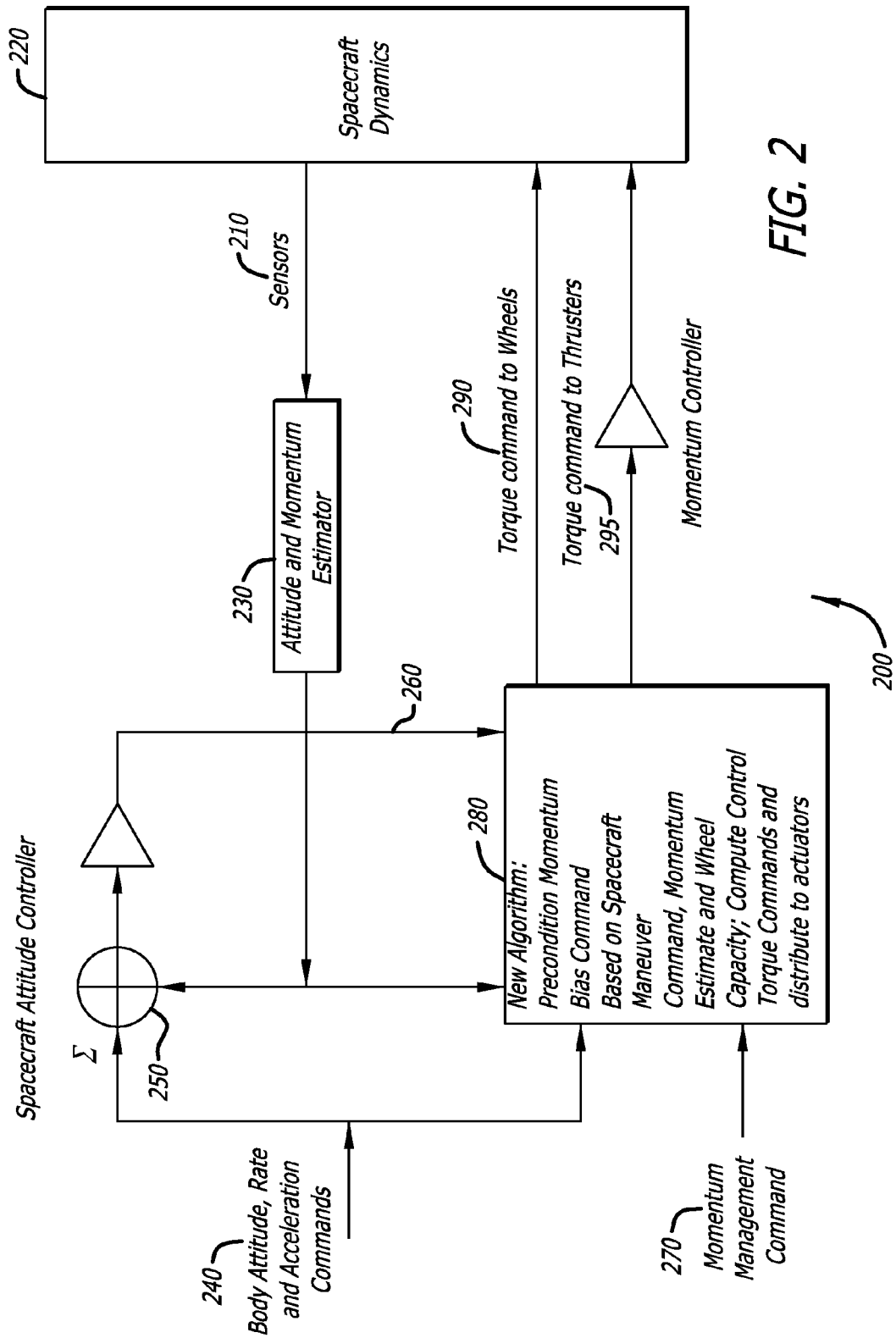
FIG. 2 shows a simplified block diagram of an attitude and control scheme for the disclosed simultaneous attitude maneuver and momentum dumping systems and methods, in accordance with at least one embodiment of the present disclosure.

FIG. 2 shows a simplified block diagram 200 of an attitude and control scheme for the disclosed simultaneous attitude maneuver and momentum dumping systems and methods, in accordance with at least one embodiment of the present disclosure. In this figure, sensors 210 read the current spacecraft dynamic state 220. Spacecraft attitude and momentum are estimated by an attitude and momentum estimator 230 from the current spacecraft dynamic state 220 in any manner known to those skilled in the art. Body attitude, rate, and acceleration commands 240 along with the spacecraft attitude and momentum estimates are used to compute the adjusted momentum bias term that tracks the spacecraft wheel based maneuver 250. Their resultant 260 along with a momentum management command 270 is then inputted into a command algorithm 280. The command algorithm 280 computes control torque commands. The torque commands are sent to the wheels 290 and to the thrusters 295, accordingly, in order to simultaneously dump momentum and slew the spacecraft.

In one or more embodiments, a general method for simultaneous attitude maneuver and momentum dumping involves performing a spacecraft maneuver using nominal wheel control; enabling thrusters during the spacecraft maneuver; and biasing an error input signal to a thruster control loop to track a wheel maneuver. The general method also involves applying a momentum management command to the thruster control loop and a wheel control loop in order for the wheels to accomplish the desired spacecraft maneuver while being reset to a de-saturated target state. Also, control gains must be selected in order to ensure spacecraft stability and prevent conflict between the spacecraft maneuver and momentum dumping objectives.

Figure 3:
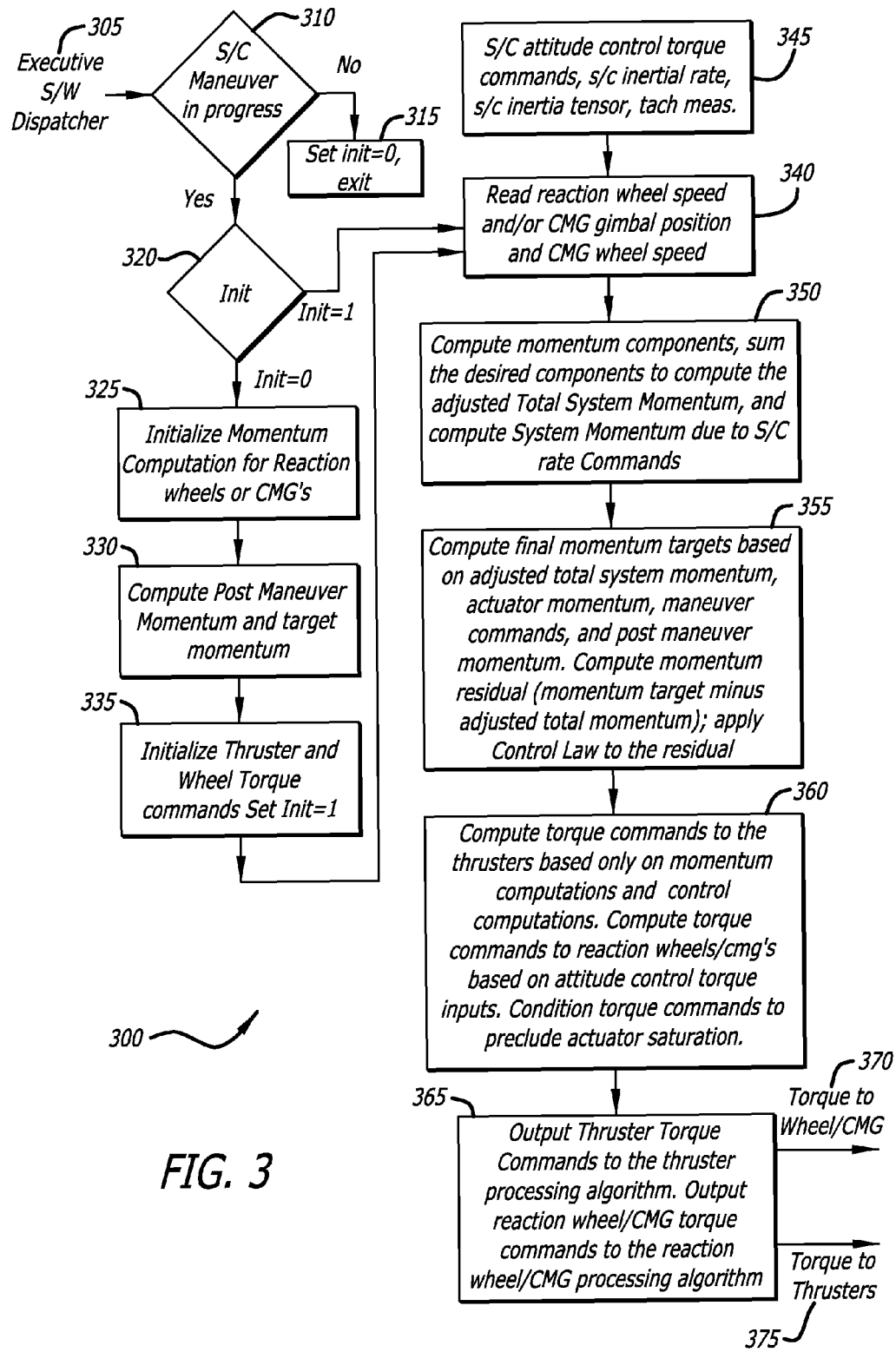
FIG. 3 is detailed process flow diagram for the disclosed simultaneous attitude maneuver and momentum dumping systems and methods, in accordance with at least one embodiment of the present disclosure.

FIG. 3 is a detailed process flow diagram 300 for the disclosed simultaneous attitude maneuver and momentum dumping systems and methods, in accordance with at least one embodiment of the present disclosure. In this figure, an executive software dispatcher initiates a spacecraft maneuver. The control logic then determines if a spacecraft maneuver is in progress 310. If a spacecraft maneuver is not in progress, the initialization flag (init) is set equal to zero (0) and the process is exited 315. However, if a spacecraft maneuver is in progress, the control logic then determines if the system is initialized 320.

If the control logic determines that the system is not initialized, the initialization flag (init) is set equal to zero (0), and the control logic initializes momentum computation for the reaction wheels or CMGs 325. After the momentum computation for the reaction wheels or CMGs is initialized, the control logic computes the desired post maneuver momentum and the target momentum 330. After the post maneuver momentum and the target momentum is computed, the control logic initializes the thruster and wheel torque commands as well as sets the initialization flag (init) equal to one (1) 335.

If the control logic determines that the system is initialized, the initialization flag (init) is set equal to one (1), and the control logic determines the reaction wheel speed and/or CMG gimbal position and wheel speed 340 using a wheel speed sensor 345 (e.g. a tachometer). The control logic computes system momentum components from the measured wheel speeds, spacecraft inertial rate, and spacecraft inertia tensor. The control logic then sums the momentum components in order to compute an adjusted total system momentum 350. Then, the control logic computes a system momentum due to spacecraft rate commands 350.

After these computations are performed, the control logic computes final momentum targets 355. The final momentum targets are based on the adjusted total system momentum, actuator momentum, maneuver commands, and desired post maneuver momentum. After the final momentum targets are computed, the control logic computes the momentum residual 355. The momentum residual is equal to the final momentum targets minus the adjusted total system momentum. Then, the control logic applies an active control law to the momentum residual 355. Types of active control laws that may be employed for the disclosed system and method include, but are not limited to a proportional integral derivative control law and a proportional integral control law.

After an active control law is applied to the momentum residual, the computed thruster torque commands and the computed reaction wheel/CMG torque commands are conditioned to preclude actuator saturation. After the computed torque commands are conditioned to preclude actuator saturation, the control logic outputs the computed thruster torque commands to a thruster-processing algorithm and outputs the computed reaction wheel/CMG torque commands to a reaction wheel/CMG processing algorithm 365. The computed torque commands are sent to the wheels/CMGs 370 and to the thrusters 375 in order to simultaneously dump momentum and slew the spacecraft.

FIGS. 4A, 4B, and 4C show graphs depicting sample results of a reference spacecraft attitude maneuver, which has initial momentum bias and no environmental disturbances. FIG. 4A shows the spacecraft attitude maneuver in degrees (deg) over time in seconds (sec). FIG. 4B depicts the spacecraft rate in degrees per second (deg/s) over time in seconds. And, FIG. 4C illustrates the wheel momentum in Newton meter seconds (N·m·s) over time in seconds.

FIGS. 5A, 5B, and 5C show graphs depicting sample results of a simultaneous attitude maneuver and momentum dumping employing the disclosed systems and methods, in accordance with at least one embodiment of the present disclosure. FIG. 5A shows the spacecraft attitude maneuver in degrees over time in seconds. In this figure, it can be seen that the spacecraft maneuver is accomplished in the same amount of time with or without momentum dumping. FIG. 5B illustrates the spacecraft rate in degrees per seconds over time in seconds. And, FIG. 5C depicts the wheel momentum in Newton meter seconds over time in seconds. In this figure, it can be seen that at time equal to 200 seconds, the wheels are de-saturated while the spacecraft maneuver is being performed.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

We claim:

1. A method for simultaneous attitude maneuver and momentum dumping, the method comprising:
   determining if a spacecraft maneuver is in progress;
   if a spacecraft maneuver is in progress, determining reaction wheel speed or control moment gyroscope (CMG) gimbal position and wheel speed;
   computing momentum components; summing the momentum components in order to compute an adjusted total system momentum; computing system momentum due to spacecraft rate commands;
   computing final momentum targets; computing momentum residual;
   applying an active control law to the momentum residual; and
   outputting computed thruster torque commands and reaction wheel/CMG torque commands.

2. The method for simultaneous attitude maneuver and momentum dumping of claim 1, wherein an executive software dispatcher initiates the spacecraft maneuver.

3. The method for simultaneous attitude maneuver and momentum dumping of claim 1, wherein the system momentum is obtained from the reaction wheel speed or control moment gyroscope gimbal position and wheel speed measurements, spacecraft inertial rate, and spacecraft inertia tensor.

4. The method for simultaneous attitude maneuver and momentum dumping of claim 1, wherein the final momentum targets are based on the adjusted total system momentum, actuator momentum, maneuver commands, and post-maneuver momentum.

5. The method for simultaneous attitude maneuver and momentum dumping of claim 1, wherein the momentum residual is equal to the final momentum targets minus the adjusted total system momentum.

6. The method for simultaneous attitude maneuver and momentum dumping of claim 1, wherein the active control law is a proportional integral derivative (PID) control law.

7. The method for simultaneous attitude maneuver and momentum dumping of claim 1, wherein the active control law is a proportional integral (PI) control law.

8. The method for simultaneous attitude maneuver and momentum dumping of claim 1, wherein the computed thruster torque commands are conditioned to preclude actuator saturation.

9. The method for simultaneous attitude maneuver and momentum dumping of claim 1, wherein the computed reaction wheel/CMG torque commands are conditioned to preclude actuator saturation.

10. The method for simultaneous attitude maneuver and momentum dumping of claim 1, wherein the computed thruster torque commands are outputted to a thruster-processing algorithm.

11. The method for simultaneous attitude maneuver and momentum dumping of claim 1, wherein the computed reaction wheel/CMG torque commands are outputted to a reaction wheel/CMG processing algorithm.

12. A system for simultaneous attitude maneuver and momentum dumping, the system comprising:
   a reaction wheel/CMG system;
   at least one thruster; and control logic in communication with the reaction wheel/CMG system and the at least one thruster, the control logic operable to:
   (a) determine if a spacecraft maneuver is in progress;
   (b) if a spacecraft maneuver is in progress, determining reaction wheel speed or control moment gyroscope gimbal position and wheel speed;
   (c) compute momentum components;
   (d) sum the momentum components in order to compute an adjusted total system momentum;
   (e) compute system momentum due to spacecraft rate commands;
   (f) compute final momentum targets;
   (g) compute momentum residual; (h) apply an active control law to the momentum residual; and
   (i) output computed thruster torque commands and reaction wheel/CMG torque commands.

13. The system for simultaneous attitude maneuver and momentum dumping of claim 12, wherein the system momentum is obtained from the reaction wheel speed or control moment gyroscope gimbal position and wheel speed measurements, spacecraft inertial rate, and spacecraft inertia tensor.

14. The system for simultaneous attitude maneuver and momentum dumping of claim 12, wherein the final momentum targets are based on the adjusted total system momentum, actuator momentum, maneuver commands, and post-maneuver momentum.

15. The system for simultaneous attitude maneuver and momentum dumping of claim 12, wherein the momentum residual is equal to the final momentum targets minus the adjusted total system momentum.

16. The system for simultaneous attitude maneuver and momentum dumping of claim 12, wherein the active control law is a proportional integral derivative (PID) control law.

17. The system for simultaneous attitude maneuver and momentum dumping of claim 12, wherein the active control law is a proportional integral (PI) control law.

18. The system for simultaneous attitude maneuver and momentum dumping of claim 12, wherein the computed thruster torque commands are conditioned to preclude actuator saturation.

19. The system for simultaneous attitude maneuver and momentum dumping of claim 12, wherein the computed reaction wheel/CMG torque commands are conditioned to preclude actuator saturation.

* * * * *